United States Patent

Köhn

Patent Number: 6,004,427
Date of Patent: Dec. 21, 1999

[54] DEVICE FOR WELDING FLATLY STACKED WORKPIECES IN THE ULTRASONIC WELDING PROCESS

[75] Inventor: Uwe Köhn, Osnabrück, Germany

[73] Assignee: Windmoeller & Hoelscher, Lengerich, Germany

[21] Appl. No.: 09/044,035

[22] Filed: Mar. 19, 1998

[30] Foreign Application Priority Data

Mar. 25, 1997 [DE] Germany .................. 197 12 498

[51] Int. Cl.⁶ ............................ B30B 5/06
[52] U.S. Cl. ............ 156/580.2; 156/73.1; 156/580.1; 156/583.5
[58] Field of Search .............. 156/73.1, 580.1, 156/580.2, 583.1, 583.5; 425/174.2

[56] References Cited

U.S. PATENT DOCUMENTS

| 4,436,585 | 3/1984 | Moodie et al. | 156/73.1 |
| 5,228,947 | 7/1993 | Churchland | 156/580.1 |
| 5,589,014 | 12/1996 | Hicks | 156/73.1 |
| 5,591,298 | 1/1997 | Goodman et al. | 156/580.1 |
| 5,672,236 | 9/1997 | Frey | 156/510 |

FOREIGN PATENT DOCUMENTS

| 0 736 356 | 10/1996 | European Pat. Off. |
| 38 13 187 | 11/1989 | Germany |
| 195 13 246 | 4/1996 | Germany |

*Primary Examiner*—James Sells
*Attorney, Agent, or Firm*—Jacobson, Price, Holman & Stern, PLLC

[57] ABSTRACT

A device for welding flatly stacked workpieces, preferably layers of tubular segments in the manufacture of sacks, by means of welds of predetermined contour in the ultrasonic welding process comprises at least one sonotrode, which is adjustable, but is stationary during the welding operation and at least one contour roller, which is assigned to said sonotrode and whose shell is provided with a contour profile, which matches the contour of the welds to be formed and which rotates at a circumferential speed that corresponds to the speed of the workpieces passing through. To weld together quite well flatly stacked workpieces, even when they tend to unfold or spread apart, the sonotrode is enclosed by a continuous belt or strap, revolving over deflecting and drive rollers. The carrying run of the belt, passing the active surface of the sonotrode, forces the workpieces to be welded against the contour roller.

7 Claims, 3 Drawing Sheets

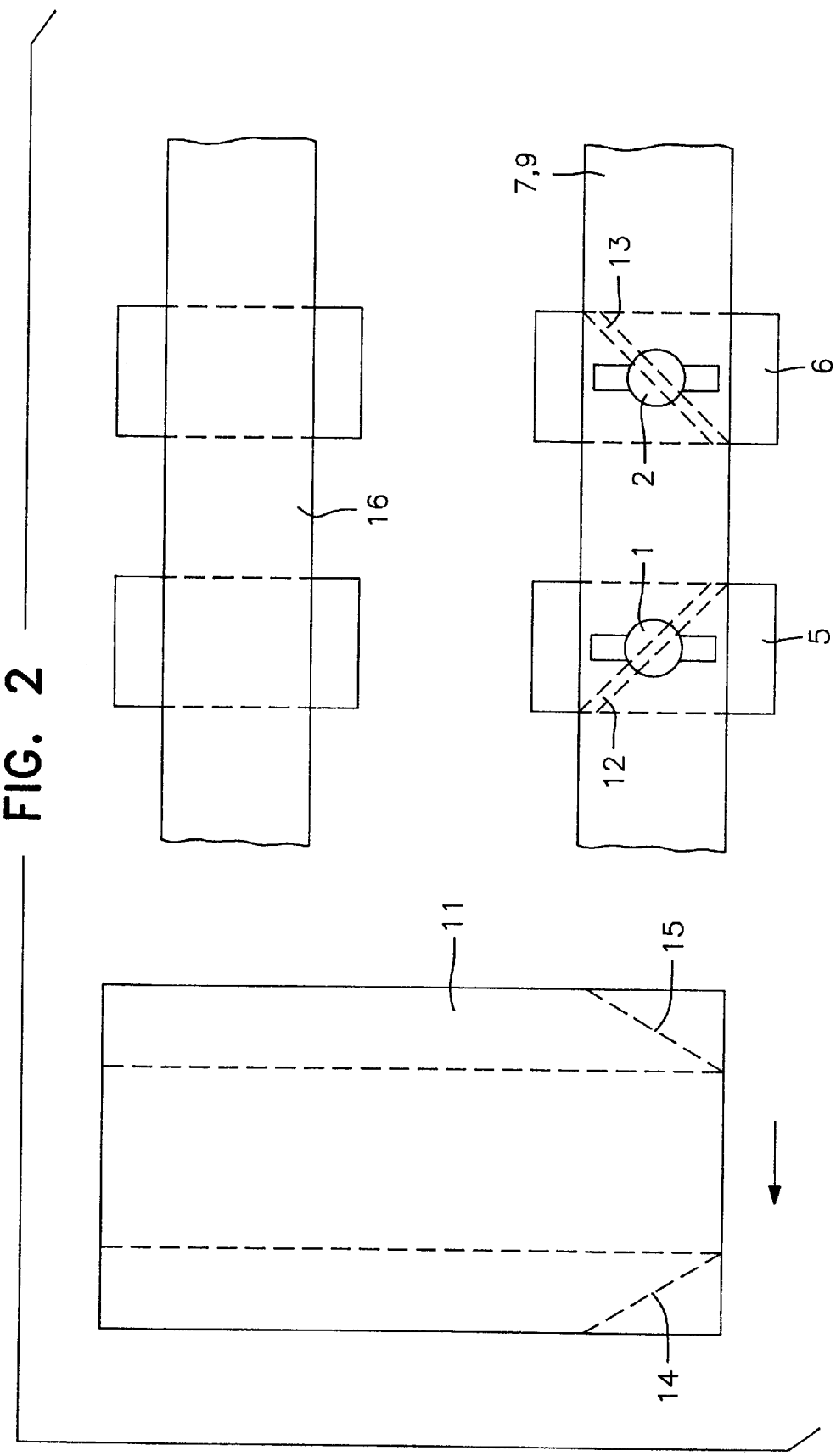

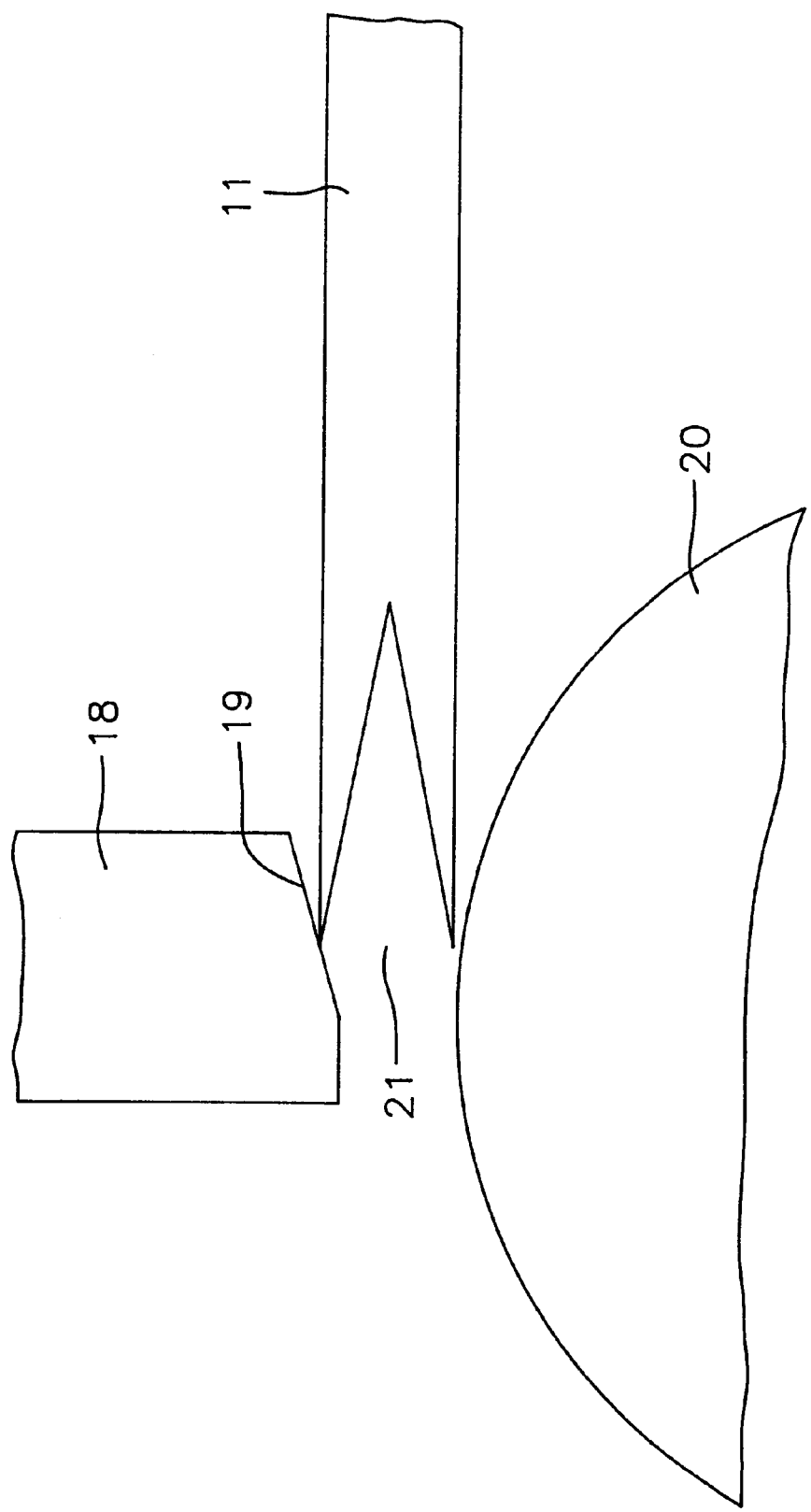

DEVICE FOR WELDING FLATLY STACKED WORKPIECES IN THE ULTRASONIC WELDING PROCESS

The invention relates to a device for welding flatly stacked workpieces, preferably layers of tubular segments in the manufacture of sacks, by means of welds of predetermined contour in the ultrasonic welding process, said device comprising at least one sonotrode, which is adjustable, but is stationary during the welding operation, and at least one contour roller, which is assigned to said sonotrode and whose shell is provided with a contour profile, which matches the contour of the welds to be formed and which rotates at a circumferential speed that corresponds to the speed of the workpieces passing through.

There exist devices for welding flatly stacked workpieces in the ultrasonic welding process of this type and they are sold and distributed, for example, by the company Hermann Ultraschalltechnik GmbH in D-76307 Karlsbad.

To weld flatly stacked workpieces well with the prior art devices in the ultrasonic welding process, it is necessary to guide them so as to lie close together as they travel through the slit between the sonotrode and the contour roller. However, this is a problem with workpieces that have a tendency to fold open or stand up. If, for example, tubular segments, which are made of a thermoplastic polymer and exhibit side folds, are provided with welds, taking hold of the side folds, good welding is possible only if the side folds lie close together in the region of the weld to be formed.

Therefore, the object of the invention is to provide a device of the aforementioned kind, with which flatly stacked workpieces can be welded together well, even when they tend to spring up or spread apart.

The invention solves this problem associated with a device of the aforementioned kind, in that the sonotrode is enclosed by a continuous belt or strap, revolving over deflecting and drive rollers, and in that the carrying run of the belt, passing the active surface of the sonotrode, forces the travelling workpieces to be welded against the contour roller.

The flatly stacked workpieces, which are to be welded with the device according to the invention, are preferably workpieces made of a thermoplastic polymer.

A preferred embodiment provides that the continuous belt and a continuous belt that encloses the contour roller and revolves over deflecting and drive rollers form a twin belt conveyor for the workpieces to be welded.

In the device, according to the invention, the continuous belt and/or the carrying run of the twin belt conveyor force(s) the flat workpieces to be welded against each other so that they cannot spring up even in the region of the folds and so that very good welding is guaranteed.

Another proposal solves the problem in that the inlet side of the sonotrode is chamfered or rounded off in such a manner that it and the contour roller form a slit that contracts in the direction of travel. Therefore, the folded open regions of the flat workpieces to be welded together are compressed in the contracting slit so that in their compressed state the regions of the flatly stacked workpieces that are to be welded pass readily through the slit.

In the device, according to the invention, the welds are formed only between the sonotrode and the contour profile of the contour roller. Frequently there is a need to change the position of the weld, for example for a shape change.

Therefore, one improvement of the invention provides a system, with which instructions regarding a higher or lower circumferential speed can be given for a short time to the contour roller. Owing to the short term higher or lower speed of the contour roller its phase position can be changed in the desired manner so that the position of the welds to be formed can be changed in the desired manner.

A preferred embodiment provides that to carry out multiple welds on a travelling workpiece there are two juxtaposed sonotrodes with related contour rollers. With such a device, corner welds for the bottoms to be formed can be affixed, for example, to the tubular segments provided with side folds.

If at least two juxtaposed ultrasonic welding systems are provided, there is a special need to orient or adjust the position of the welds relative to each other. Therefore, another design of the invention provides that at least one of the contour rollers is provided with a device for increasing or decreasing for a short time its circumferential speed. By suitably increasing or decreasing the circumferential speed, the phase position of the contour rollers can be adjusted with respect to each other in the desired manner, so that the respective position of the completed welds can be changed.

The device for increasing or decreasing the circumferential speed of the contour rollers for a short period of time can comprise a differential gear, a stepping motor or a frequency-controlled synchronous motor. An additional positive or negative speed for changing the phase position can be fed in with a differential gear. Furthermore, the circumferential speed of the contour rollers can be changed for a short period of time with a stepping motor or a frequency-controlled synchronous motor.

One embodiment of the invention is explained in detail below with reference to the drawings.

FIG. 2 is a top view of the device according to FIG. 1; and

FIG. 3 is a side view of a sonotrode, which interacts with a contour roller and forms with it a contracting inlet slit.

Figure 1:
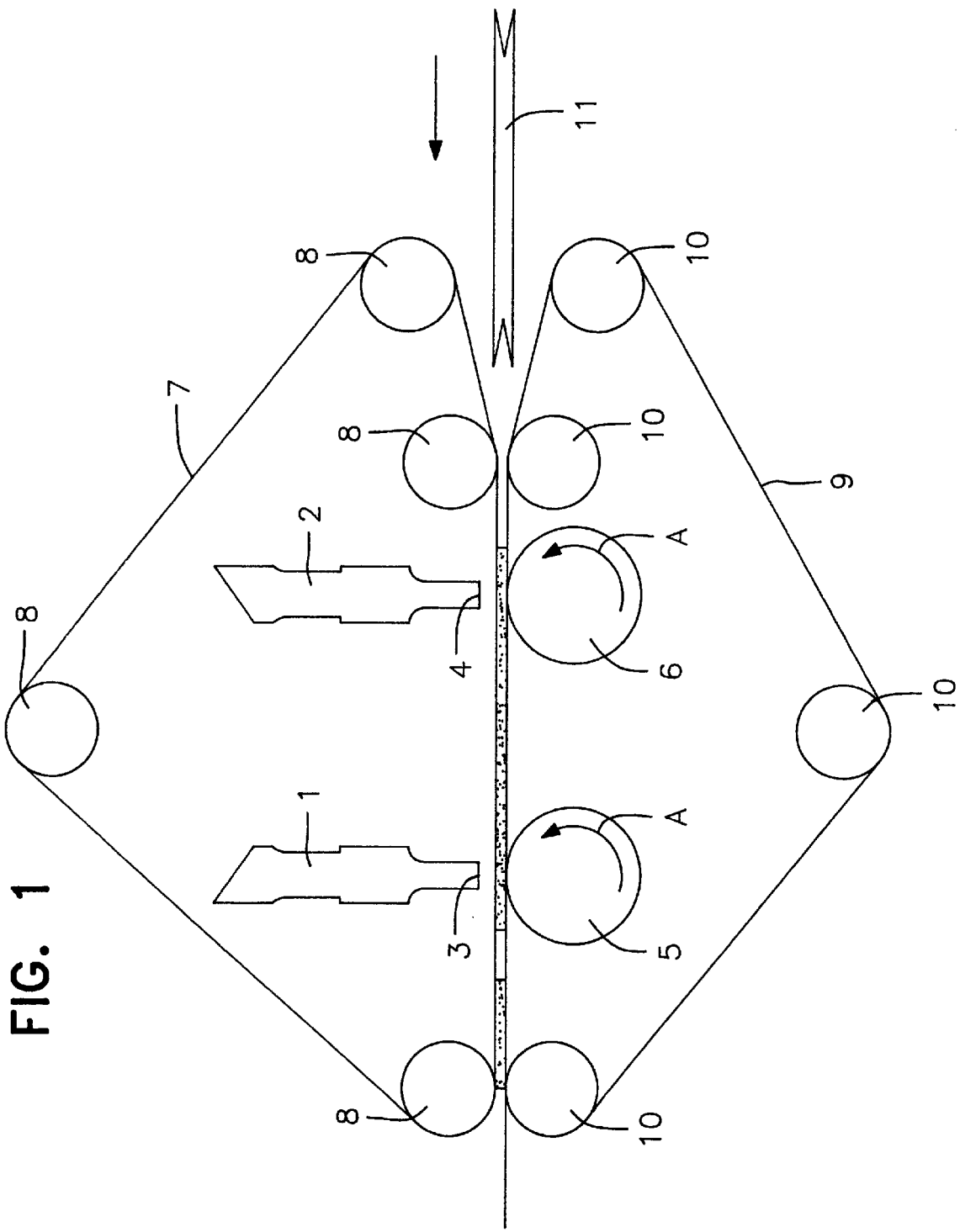
FIG. 1 is a diagrammatic side view of a device for welding flatly stacked workpieces in the ultrasonic welding method.

Mounted in a frame (not illustrated) are two sonotrodes 1, 2, whose front sides 3, 4, forming the active surfaces, face the contour rollers 5, 6, mounted in the frame. The center lines of the sonotrodes 1, 2 are at right angles to the rotational axes of the contour rollers 5, 6. The sonotrodes 1, 2 and the contour rollers 5, 6 define a slit of specified width.

The contour rollers 5, 6 are driven by drives (not illustrated) in the direction of the arrow A.

The sonotrodes 1, 2 are enclosed by a continuous belt 7, which is guided over drive and deflecting rollers 8, mounted in the frame.

The contour rollers 5, 6 are also enclosed by a continuous belt 9, which is guided over drive and deflecting rollers 10, mounted in the frame. The continuous belts 7, 9 form a twin belt conveyor, whose runs, which face each other, form a conveying distance, on which the flat workpieces, in the illustrated embodiment a thermoplastic tubular segment 11, provided with side folds, are guided through the slit between the sonotrodes and the contour rollers. The bottom run of the continuous belt 9 runs directly over the contour rollers 5, 6, whereas the upper carrying run of the twin belt conveyor travels at a distance below the sonotrodes.

As evident from FIG. 2, the contour rollers 5, 6 are provided with oblique welding contours 12, 13, which provide the travelling workpieces 11 with corner welds 14, 15 in the region of the side folds.

To prevent the workpieces 11 from distorting while travelling through the device, there is another revolving twin belt conveyor 16, which runs parallel to the twin belt conveyor 7, 9 and which conveys the rear area of the workpieces 11 through the apparatus.

Of course, the rear area could also be provided with a welding apparatus, which corresponds to the one described in FIG. 1 and which also provides, for example, the rear areas of the tubular segments 11 with corner welds.

To change, for example, with a change in format also the distance between the corner welds 14, 15, the contour rollers 5, 6 are provided with a drive, by means of which at least one of the rollers is instructed to change the circumferential speed in order to change the phase position of the weld contours 12, 13.

In the embodiment according to FIG. 3, the sonotrodes 18 exhibit a chamfered inlet side 19 so that it and the related contour roller 20 form a contracting inlet slit 21. In this contracting inlet slit the folded open side fold region of the advancing side of the tubular segment 11 is compressed in the requisite manner so that the result is good welding.

I claim:

1. Device for welding flatly stacked workpieces, preferably layers of tubular segments in the manufacture of sacks, by means of wells of predetermined contour in the ultrasonic welding process, said device comprising at least one sonotrode, which is adjustable, but is stationary during the welding operation and at least one contour roller, which is assigned to said at least one sonotrode and whose shell is provided with a contour profile, which matches the contour of the welds to be formed and which rotates at a circumferential speed that corresponds to the speed of the workpieces passing through, the sonotrode being enclosed by a continuous belt or strap, revolving over deflecting and drive rollers, and the carrying run of the belt, passing the active surface of the sonotrode, forces the travelling workpiece to be welded against the contour roller.

2. Device, as claimed in claim 1, wherein the continuous belt and a continuous belt that encloses the contour roller and revolves over deflecting and drive rollers form a twin belt conveyor for the flat workpieces to be welded.

3. Device, as claimed in claim 1, wherein the inlet side of the sonotrode is chamfered or rounded off in such a manner that it and the contour roller form a slit that contracts in the direction of travel.

4. Device, as claimed in claim 1, further comprising a system, with which instructions regarding a higher or lower circumferential speed can be given for a short period of time to the contour roller.

5. Device, as claimed in claim 1, wherein to carry out multiple welds on a travelling workpiece there are two juxtaposed sonotrodes with associated contour rollers.

6. Device, as claimed in claim 5, wherein at least one of the contour rollers is provided with a device for increasing or decreasing for a short time the circumferential speed.

7. Device, as claimed in claim 4, further comprising a different gear, a stepping motor or a frequency-controlled synchronous motor.

* * * * *